Patented Jan. 10, 1933

1,894,097

UNITED STATES PATENT OFFICE

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA

METHOD OF MAKING SOLVENTS

No Drawing.   Application filed October 31, 1924. Serial No. 747,106.

In several copending applications, particularly Serial Nos. 337,705 now Patent No. 1,597,796 of August 31, 1926; 435,355; 473,798 and 576,638 now Patent No. 1,597,798 of August 31, 1926, I have disclosed methods for carrying out a partial oxidation process to obtain from carbon compounds, such as petroleum oils, shale oils, or oils from the low temperature distillation of coal a larger proportion of products, which are sufficiently volatile to come within the boiling point ranges of motor fuel and of kerosene. In said process the vaporized oil is mixed with air in certain measured proportions and passed over a catalyst, such as the blue oxides of molybdenum, at a temperature between 200° C. and 500° C. and the mixture of vapors and gases produced is cooled down, giving certain condensed products.

I have found that such liquid partial oxidation products, particularly those from such fractions of the oxidation mixture or even from the entire mixture, have the power to a marked degree of functioning as solvents such as used for paint, varnish or lacquer films.

For such purposes, I may prepare these solvents as follows:

The chemical composition of these products varies with the raw materials used and with modifications of the process, but consists essentially of alcohols, aldehyde alcohols, aldehydes and oxygenated organic acids, together with ketones, particularly in cases where the higher temperatures within my range are employed.

I have found that the more volatile portions of the products are well adapted under certain conditions for use as solvents. In preparing these solvents, I may follow one of several methods:

(1) I may partly oxidize the hydrocarbon fraction by my vapor phase catalytic oxidation process, as for example, set forth in my copending application, Serial No. 435,355, and distil the condensed product up to the highest point that is allowable for the use to which the solvent is to be applied. For example, in some cases, I may distil up to 200° C. and in other cases up to through 325° C., depending on the character of solvents and on the raw material which is being treated. The lighter fraction thus obtained will contain a smaller percentage of free oxygenated organic acids than the remaining heavier portions. This percentage of free acids will injure the material for dissolving varnish gums to be used on metallic surfaces, but may be used, however, as a solvent for many purposes. Where the presence of the acids is undesirable, they may be removed from this lighter fraction by treatment with ordinary caustic soda or lime saponification. The lighter material thus freed from fatty acids forms an excellent solvent for resins, gums, etc., for many purposes. This treatment will remove the acids and their compounds.

(2) I may take the lighter fraction from the distillation and esterify the acids. This may be carried out by means of the alcohols already in the mixture or by the addition of alcohols. I may esterify by passing through the mixture a stream of dry hydrochloric acid gas, preferably applying heat during the process to raise the mixture to about 70° C. The resulting mixture is preferably washed with water, or if necessary, with a cold dilute sodium carbonate solution to remove any acids. If necessary, it may then be distilled to obtain a solvent having the right range of volatility for the particular purpose to which it is to be applied. This distillation is usually necessary because of the formation during esterification of other condensation products which have higher boiling points.

Instead of esterifying the free acids by the alcohols present in the mixture, I may aid the esterification by adding alcohols such as ethyl, methyl or other alcohols, which may be cheap enough for the purpose. Otherwise, the esterification is carried out substantially as before, except for the addition of alcohol in sufficient amount to esterify substantially all the free aldehyde-fatty acids present.

It will be noted that the lighter fraction may be used with the acids present, or with the acids removed, or with the acids separated and subsequently converted into esters.

Where it is desired to increase the amount of volatile material in a given oxidation mixture, methods similar to those of my applications above referred to may be employed to increase this percentage. Such, for example, as the well known cracking or thermal decomposition processes. In such cases, as the volatile material resulting from the decomposition of the material, say within the kerosene range, still contains free oxygenated organic acids and oxygenated products, the removal of the acids or their compounds may be carried out as above described.

It will also be understood that "cracked" material may be used in carrying out my partial oxidation process or that the material may be "cracked" after the use of said process, either before or after distilling. The material employed in the main process may be cracked either by pressure methods or by atmospheric cracking methods, as desired. To increase the yield of volatile solvent, where the price will justify the expense, I may treat heavy naphtha or even gasoline as the raw material for the partial oxidation step instead of kerosene or gas oil which would usually be employed, thus obtaining a mixed product of less average molecular weight.

I may also decompose the vapor products coming from my partial oxidation apparatus by passing the vapor gas stream through a heated tube containing catalytic material which will break down the organic acids into ketones and other bodies of relatively low molecular weight. This catalytic material is preferably heated magnesium oxide or other basic oxides, preferably an oxide whose carbonate decomposes at a relatively low temperature, in the form of a layer of lumps through which the stream passes. According to my present invention, however, I prefer to pass the vapor gas stream over this basic oxide after leaving the partial oxidation apparatus and before reaching the condenser. The heated tube which I have used in series with the oxidizing apparatus is twelve inches internal diameter and about sixty inches long. During a run the tube is heated externally to a visible red heat for its length and the last quarter of the tube is filled with lumps of magnesia, usually the 85% magnesia pipe covering broken into pieces about the size of a walnut. By the use of this oxide, I obtain more of the lighter molecular weight product and believe that I also increase the ketone content. This magnesium oxide decomposes some of the acids, although part of them remains in the mixture.

In obtaining the solvent, I may distil the condensed product up to about 200° C. and then take this product and remove the aldehydes, ketones and acids. These bodies when combined in one mixture will serve as a solvent. In carrying this out, I remove the free acids by lime or caustic soda or similar treatment. Also I may free these acids from the soaps thus formed, esterify them and add the esters thus formed to the aldehydes and ketones as solvents. I may remove the aldehydes and ketones by agitating with a saturated solution of sodium acid sulphite under such temperature conditions as in a given case will form the well known "aldehyde bisulphites" and "ketone bisulphites".

In this bisulphite treatment, it will be understood that the bath separates into layers, the lower water layer containing the aldehyde bisulphites and the ketone bisulphites so that the upper oil layer may be drawn off and then similarly the water layer. The top layer contains the other remaining constituents of the product excepting, of course, the aldehydes and ketones. The aldehydes and ketones may be liberated from the bisulphites by treatment with dilute acids or dilute alkalis. After this removal of the aldehydes and ketones, the remainder, consisting mainly of alcohols, ethers and hydrocarbons, will form an excellent motor spirit. I may also remove the acids before removing the aldehydes and ketones by the bisulphite treatment.

I may then continue the distillation up to 300° or 325° C. and then for solvent use I preferably remove the acids. In this treatment, some of the aldehydes are also removed. The remaining material freed from acids having a boiling point of from about 200° C. to 300° C. or 325° C. may be used as a solvent. The acids which have been removed may be esterified as before and added to the solvent, if desired. The fraction will also be treated as above recited to remove the aldehydes and ketones. The acids may be separated as above described and esterified or not as desired. The material which remains after distilling up to about 300° or 325° C. is available for soaps, greases, resins, acids, etc. Any of the acids may be used for making lime soaps for grease or for making soda soaps for blending with soaps from acids of the other ranges.

Furthermore, the material remaining from the 200° to 300° or 325° C. range, after removing the acids and part of the aldehydes, may be re-run through my partial oxidation apparatus, together with an amount of fresh or green oil sufficient to make up all the loss. In re-running through the apparatus with the basic oxide in series with the apparatus, as before described, the re-run material gives a larger percentage of lighter motor spirit or solvent.

As my main partial oxidation product contains already formed esters, as well as aldehydes, ketones, etc., all of different molecular weights and are completely soluble in the oil mixture, ordinary methods of separation can not be relied upon, as other generic bodies fall within the same boiling range as the esters.

Although all the solvent mixtures prepared by the various methods outlined above have the property of dissolving ordinary paint and varnish films, it is desirable for certain kinds of paint or lacquer removal to provide liquids of much greater and more rapid solvent action. These lacquers include particularly the nitrocellulose-gum films, and for their removal a true nitrocellulose solvent must be employed. Such solvents can be prepared from my partial oxidation mixtures by the method outlined as follows:

I have discovered that ordinary (95%) alcohol has the property of dissolving mainly the esters and more highly oxidized bodies from the mixture of partially oxidized oils. However, when such solvent is applied to a product which was more highly oxidized, a complete solution resulted. Further experimenting on this subject has disclosed the fact that if water in carefully regulated amounts be added to the alcohol, the quantity of oxidized bodies taken out of the mixture into the alcohol layer can be nicely controlled.

I may use this method of selective solution on such partial oxidation mixtures modified by the utilization of other selective solvents than ethyl alcohol and water, or mixtures of ethyl and one-tenth its volume of methyl alcohol or denatured alcohol with water. Any solvent or mixture of solvents may be used which has the property of dissolving such more highly oxidized bodies as are present in the mixture and leaving the larger part of the hydrocarbons and bodies that contain less oxygen in a separate layer, and will come under my invention. For example, other alcohols, such as propyl alcohol, may be manipulated in the same manner as I describe with the denatured ethyl alcohol. Also I may use any suitable blend of alcohols and esters (usually diluted with water), the alcohols and esters being such that they can be easily removed by distilling from the extracted portion, thus preparing the solvent for re-use. I may also use glycerine, glycerine and alcohol, or glycerine and esters.

The components of the partial oxidation mixture most desirable for a commercial solvent for nitrocellulose, gums, etc., consist mainly of the esters, aldehydes and ketones. Therefore, by mixing the product with various admixtures of water and alcohol, I have found that I can easily proportion the alcohol-water mixture against this partial oxidation mixture in such a manner that only the more highly oxidized bodies pass into solution in the alcohol layer which is formed; and on drawing off this lower dilute alcohol layer in any suitable manner, I can obtain the alcoholic solution of esters, aldehydes and ketones. I can then distil off the alcohol, leaving such esters, aldehydes and ketones ready for use as a solvent, either with or without purification. I have also found that it is usually preferable to remove the water which is present by suitable dehydrating agent before distilling off the alcohol, although this step may be carried out by distillation.

I prefer to select fractions of the partially oxidized oily product (preferably made by vacuum distillation) which give solvents boiling within certain ranges.

When desired, I may remove part or all of the aldehydes and ketones from the drawn off layer of partial oxidation mixture by precipitation, using, for example, sodium bisulphite, but as a rule, this is unnecessary, since distillation, either at atmospheric pressure or preferably in a partial vacuum is sufficient for purification. The aldehydes and ketones are in themselves good solvents, and may usually be retained.

I have referred to the small content of free acids which is present in these partial oxidation mixtures. In order to utilize these free oxygenated organic acids, I may complete the esterification by adding a small amount of a suitable esterifying catalyzer, such as hydrochloric acid, and allow the reacting mixture to stand until equilibrium has been attained. It is preferable to allow this reaction to take place at ordinary temperatures, several days being necessary therefor. The hydrochloric acid may be bubbled into the mixture in the form of dry gas, or it may be added in the form of its solution in absolute alcohol, usually 1% of absolute alcohol carrying 25% of hydrochloric acid is ample for the catalyzer. After this esterifying action is practically complete, I may proceed to obtain the esters, aldehydes and ketones from the selected solvent, as above described.

I have also found that (depending on the kind of oil oxidized and the degree of oxidation), I can make a much better product and may in some cases dispense with any further purification of the product, if the oxidation mixture which I first remove is (after the removal of the first alcohol solvent) again subjected to the alcohol extraction process. This second alcoholic solvent may be much higher in its alcohol content for we can now to good advantage get into the alcoholic layer a larger percentage of the oil treated than in the first extraction.

In this case, I prefer to use an alcohol-water or other available solvent that will take out from 60 to 90% of the oil first extracted. The remaining steps may be the same as those outlined for the first extraction, that is, distillation to remove the alcohol or other solvent, followed, if desirable, by distillation of the extracted oxidation mixture.

Again, I may vary the whole extraction process by first carefully fractionating the complex oxidation mixture by distillation into narrower cuts, in some cases 50° C. or less apart. Then by making a special study of the extractions of each cut, I have found that I can considerably increase the total yield of good solvents desired over that obtained by any method of extracting applied in the first instance to the total oxidation mixture or to larger oxidation fractions, such as the total fraction under 200° C. I believe that this increased yield is possible, because where a wider range mixture is extracted, the substances first going into the alcohol layer exert an influence on the solvent action of the alcohol probably hindering further solutions of valuable compounds. I may catalyze each fraction as before noted in order to increase the ester content, or I may catalyze the whole mixture before distillation, thus proceeding with the extraction in the usual way, and if necessary, making the second extraction noted above.

Where mixtures of exceedingly high values are desired, a third extraction, such as described herein, may be used.

I may in general apply the foregoing methods of extraction and purification to the so-called "top layer", thereby increasing the yield of valuable solvent. These mixtures are all oily in character, and are therefore relatively water repellant.

The volume of diluted alcohol needed in the above extractions will vary, and is governed by the particular dilution desirable for taking out the desired percentage of partly oxidized products. Generally speaking, I have used amounts of diluted alcohol varying from equal volumes thereof and the oil under treatment down to one-half as much diluted alcohol as partly oxidized oil or fraction, and I have found that where dilution around 10% of water is used on highly oxidized oils, the one-half ratio is preferable. The following example (single extraction) will illustrate some applications of my process.

*Example I*

1 liter of partially oxidized kerosene (Pennsylvania petroleum) made in accordance with my vapor phase catalytic process was used. This fraction was subjected to the vapor phase catalytic air oxidation method, and the acids were removed from the product by lime saponification, the non-saponifiable oil being then returned and subjected to the same partial oxidation method. This gives a product having a high content of oxidized bodies, as described in my various copending applications.

The partly oxidized product was dried by allowing it to stand over night with 10% of its weight of anhydrous calcium chloride in the containing vessel. Dry hydrochloric acid gas was then passed into the oil for five minutes. The reactions ensuing raised the temperature to about 70° C. The mixture was then heated on the water bath for one hour and allowed to stand over night. Test portions of the resulting product were then taken for the extraction test.

The alcohol used was of the grade known as "95 Laboratory Denatured" and by volume showed the following composition:

|  | Parts |
|---|---|
| Ethyl alcohol | 90 |
| Methyl alcohol | 5 |
| Water | 5 |

The first stock solution of diluted alcohol was 50 cc. of the 95 alcohol plus 1.25 cc. of water.

The second stock solution—50 cc. of the 95 alcohol plus 2.5 cc. of water.

The third stock solution—50 cc. of the 95 alcohol plus 5 cc. of water.

*Extractions*

10 cc. of the first stock solution was shaken up with 10 cc. of the above oxidation product, giving complete miscibility, with no separation.

10 cc. of the second stock solution was shaken up with 10 cc. of the above oxidation product and gave 6.8 cc. in the upper or non-alcoholic-soluble layer.

10 cc. of the third stock solution was shaken up with 10 cc. of the above oxidation product and gave 8 cc. in the upper layer.

I then selected the third stock solution and 250 cc. of the dried and catalyzed (HCl) oxidation product was treated with an equal volume of this alcoholic solution. The lower alcoholic layer was drawn off from the upper 80% layer, which upper layer contains usually about 15% of alcohol, and from this lower layer the alcohol and other substances boiling below 100° C. were removed by distillation. In each case, the upper layer contains all of the hydrocarbons and some of the more highly oxidized bodies from the original mixture. Continuing the distillation of the extracted product at atmospheric pressure 20 cc. of the solvent was obtained which boiled from 100 to 175° C., and also 20 cc. was obtained which boiled from 175 to 225° C.

The first fraction boiling from 100 to 175° C. completely dissolved the lacquer type of nitrocellulose, while the second fraction gelatinized the same nitrocellulose. This test shows that about 50% of the above alcoholic extract of the oxidized oil can be worked into nitrocellulose lacquer formulas, this being about 15% of the partly oxidized oil product treated.

*Example II*

In order to further study the distribution of the constituents of the partial oxidation mixture which have the property of dissolving nitrocellulose, the following extraction was made, there being also introduced a modification of the catalyzing (HCl, etc.) treatment in this case.

500 cc. of the 200 to 300° C. fraction of the rerun oxidized kerosene product was shaken up with 350 cc. of the third stock solution above recited. This gave an upper oil layer of about 80% of the whole oxidation product treated. The lower layer was then drawn off and one-tenth cc. concentrated hydrochloric acid solution and 10 grams of anhydrous sodium sulphate was added. The mixture was heated under an invert condenser on a boiling water bath for six hours. On cooling, the solution was filtered from the excess sodium sulphate and the hydrated form thereof which resulted from the dehydration and was then distilled. The first part of the distillation was carried out at atmospheric pressure to remove the alcohol and substances boiling under 110° C. Vacuum was then applied and at about 3.5 cm. of mercury, the following cuts were made.

First cut up to 125° C. _____ 27 cc.
Second cut 125-140° C. _____ 21 cc.
Third cut 140-160° C. _____ 22 cc.

Of these cuts the first one readily dissolved nitrocellulose, while the second and third cuts gelatinized it. As the above distillation was carried out in a vacuum of 3.5 cm. of mercury, the boiling point at atmospheric pressure of the above solvent would run as high as 260° C. However, this is desired in lacquer formulas, and such substances as are known in the lacquer trade as "high boilers", and is desirable in order to secure horn-like films.

It should be noted that the foregoing results and many others of the same character were obtained without any purification of the final solvent product. I may apply any of the methods well known to organic chemists for purifying this material, such as redistillation and vacuum, filtration through fuller's earth, bone black or activated charcoal, to improve the color and odor of the material. I may also in special cases treat the product, preferably in alcoholic solution, to remove part of the aldehydes and ketones. This may be done by the addition of sodium bisulphite. If an unpleasant odor persists due to a small percentage content of volatile aldehydes, I may resort to the above or similar means for purifying.

In special cases where higher purity, and particularly freedom from odor is desired in these solvents, the method of purification may be still further modified.

These modifications in the purification process are desirable for removing small quantities of volatile bodies that have a sharp disagreeable odor.

One of these methods consists in the agitation of the solvent with one-fifth of its volume of a 15% caustic soda solution, preferably warming the whole to about 75° C. This agitation is continued from one-half hour to two hours usually depending on the quantity of undesirable substances present. Washing with water, drying and distilling in a vacuum will then produce a solvent that is practically odorless.

A somewhat better method of purification consists in agitating the solvent (cold) with diluted sulphuric acid (from 50% to 85%) using from 5 to 10% of the diluted acid by volume as compared with the solvent treated. This agitation usually need not last more than one-half hour. The solvent may then be washed, dried and vacuum-distilled, or the acid treatment may be followed by the caustic treatment above or by a boiling lime water treatment. In all cases, I prefer to finish by making a vacuum distillation.

Where free organic acids are still present in the final solvent product, I may remove these as, for example, by agitation with pure calcium carbonate and final exact neutralization with sodium carbonate and sodium hydroxide.

A variety of solvents may thus be prepared which have the property of dissolving paint, varnish and lacquer films of various kinds. I may apply any of these solvents as a paint, varnish and lacquer remover in several ways, depending upon the volatility of the solvent used. It will be noted from the foregoing description that I may prepare solvents ranging in boiling point from 60° to 350° C.

Wherever desirable, I may use certain fractions, particularly the heavier fractions of the solvents, without the additions well known in this art of paint removers, such as waxes, etc. which will prevent rapid evaporation until the solvent has softened the paint, varnish or lacquer film. These heavier fractions have such relatively low volatility that in many cases the addition of a wax or wax-like substance is not necessary. I may, however, add wax or waxy bodies or solid fatty acids to the solvent, particularly in the case of the lighter fractions, and also add alcohol, acetone or equivalent material for gelatinizing or precipitating the wax employed, as is common in this art. When this is done, the gelatinous mass can be spread on vertical surfaces and will function both by retaining the solvent on the surface and preventing the escape of the solvent by evaporation. Other materials may be added, if desired, to render the mixture more easily handled.

As above noted, I may vary the solvent derived from the original oxidation product in accordance with the desired purpose, this referring mainly to the volatility of the product as a paint remover. Where old nitrocellulose lacquers are to be removed, I may use the nitrocellulose solvent prepared by any of the solvent extraction methods outlined above. Obviously, the method provides a range of products which are available as solvents for the removal of practically all paint, varnish or lacquer film, known in the trade at the present time. By the word "alcohol" in the claims, I intend to cover any alcohol or its equivalent.

Many variations may be made in the main oxidation process, as well as in the preparation of the solvents, the fractions employed, etc., without departing from my invention.

I claim:

1. In the manufacture of solvents, the steps consisting in fractioning the product of partial oxidation of aliphatic hydrocarbons and extracting more highly oxidized bodies from a resulting fraction by a solvent other than water.

2. In the manufacture of solvents, the steps consisting of fractioning the product of partial oxidation of aliphatic hydrocarbons, adding alcohol to a fraction and esterifying the mixture, and then extracting more highly oxidized bodies from the esterified fraction by a selective solvent other than water.

3. In the manufacture of solvents, the steps consisting of partially oxidizing a petroleum fraction of less average molecular weight than kerosene, fractioning the product, and extracting more highly oxidized bodies from a fraction by a selective solvent other than water.

4. In the manufacture of solvents, the steps consisting of partially oxidizing a petroleum fraction of less average molecular weight than kerosene, fractioning the product and esterifying a fraction, and extracting more highly oxidized bodies therefrom by a selective solvent other than water.

In testimony whereof I have hereunto set my hand.

JOSEPH HIDY JAMES.